United States Patent [19]

Fracalossi et al.

[11] 4,385,131

[45] May 24, 1983

[54] POLYURETHANE FOAM RESISTANT TO SMOLDERING COMBUSTION CONTAINING EITHER UREA OR MELAMINE

[75] Inventors: Roland N. Fracalossi; Walter V. V. Greenhouse; Michael S. Buchanan, all of Baltimore, Md.

[73] Assignee: Wm. T. Burnett & Co., Inc., Baltimore, Md.

[21] Appl. No.: 274,726

[22] Filed: Jun. 18, 1981

[51] Int. Cl.³ .............................................. C08G 18/14
[52] U.S. Cl. ................................... 521/55; 428/316.6; 428/317.9; 428/318.4; 428/319.1; 428/319.3; 521/128
[58] Field of Search ............... 521/55, 128; 428/316.6, 428/318.4, 319.1, 319.3, 317.9

[56] References Cited

U.S. PATENT DOCUMENTS 3,717,597  2/1973  Hesskamp et al. ................... 521/128
3,897,372  7/1975  Kehr et al. ........................... 521/903
4,054,706  10/1977  Shapiro ............................... 428/213

Primary Examiner—Maurice J. Welsh
Attorney, Agent, or Firm—A. W. Breiner

[57]     ABSTRACT

Rebonded polyurethane foams having incorporated into the foam urea and/or melamine are described. The rebonded foams have excellent resistance to smoldering combustion and flaming combustion. The rebonded foam is highly suitable, inter alia, for cushioning and seating structures.

13 Claims, No Drawings

POLYURETHANE FOAM RESISTANT TO SMOLDERING COMBUSTION CONTAINING EITHER UREA OR MELAMINE

This invention relates to polyurethane foams. More particularly, this invention relates to rebonded polyurethane foams having controlled density, strength, and resiliency characteristics which are highly resistant to smoldering and flaming combustion.

The usage of polyurethane foams as a cushioning or padding material has greatly increased in the last ten to twenty years, primarily due to the excellent physical properties of polyurethane foams. Polyurethane foams are available having soft and resilient characteristics rendering them useful, for example, in pillows and blankets. Other polyurethane foams have moderate load-bearing characteristics and as a result are widely used, for example, as seatings in furniture and as fillings for mattresses. Still other polyurethane foam compositions are relatively firm and find application in men's and women's apparel, packaging, thermal and acoustical insulation, and carpet underlay. The versatility and quality of the products that can be manufactured from polyurethane foam are related to the advances that have been made in the chemistry of polyurethane raw materials and in the technology that has evolved in the formulation and processing of materials into satisfactory and needed products.

While the marketplace for polyurethane foams has witnessed innovations and improvements which have led to greatly expanded usage of polyurethane foams, there has been increasing concern that more needs to be done to reduce the fire potential of polyurethane foams. This concern with respect to fire is partly related to the increased effort which has been expended in recent years to reduce the number of injuries and fatalities to people that are caused by fires whatever the reason and source. Emphasis has been placed on a nuamber of factors that directly influence the magnitude of fire problems, both in terms of human suffering and physical damage or loss of property. For example, educational programs in fire prevention are conducted widely; fire alert and fire protection systems have been improved. As a corollary to this concern, in recent years federal, state, and local regulations have been established intended to protect life and property from fire. These regulations often impose rigorous requirements in the specifications set for materials and products used by the consumer so as to make the materials and products safer for use. Many of these requirements take the form of test procedures designed to assess the fire potential of a particular material. In most cases the test procedure is small in scale, but some tests approach the dimension of a full-scale evaluation. In either case there is an effort to determine the fire potential of a material under controlled conditions.

The prior art of polyurethane foams establishes considerable activity with regard to reducing the fire potential of polyurethane foams. The use by the foam industry of chemical substances that are described as flame-retardant or combustibility modifiers has increased substantially. While considerable progress has been made in a number of areas of foam application and polyurethane foams have been produced that show improved resistance to an open flame or spark, there has been insignificant progress in the effort to prevent fires started under conditions of smoldering combustion. For example, an upholstered chair or sofa in the home or office can be very susceptible to ignition from a lighted cigarette dropped upon it. There have been upholstery fabric constructions in use over polyurethane seating assemblies that give rise to uncontrolled smoldering of the fabric and the foam, which leads to ignition and destruction of the furniture. Fabrics of the above type have been sorted out by tests and described as Class II fabrics by the Upholstered Furniture Action Council (UFAC), an industrial group that represents a large number of furniture manufacturers in the United States. Class II fabrics have been popular because they provide the fabric manufacturer with greater versatility in design, structure, and weight of fabric—features that are obviously more attractive to the homeowner. Other fabrics have been designated as Class I by UFAC. These Class I fabrics can be used over polyurethane foam seating assemblies without causing smoldering combustion in the presence of a lighted cigarette. Class I fabrics are of limited construction and, while obviously safer to use, offer less in fabric selection and features.

It is a primary object of this invention, therefore, to produce polyurethane foams that can be used in upholstered furniture with either Class I or Class II fabrics as designated by the UFAC without causing ignition of the foam cushioning or furniture using the foam cushioning by lighted cigarettes and the like.

It is another object of this invention to provide polyurethane foam that, in addition to providing cushion assemblies which are resistant to cigarette ignition, meets ignition tests which are widely used to determine a material's relative resistance to an open flame, such as Federal Motor Vehicle Safety Standard No. 302 which has application to all materials used in the interiors of automobiles; and Federal Aviation Administration Regulation No. 25.853 which regulates the flammability characteristic of materials used in the interior of aircraft.

It is another object of this invention to produce polyurethane foam having properties that are functional and desirable in comfort cushioning, while at the same time providing significantly improved safety features in the way of increased resistance to both smoldering and flaming combustion.

It is still another object of this invention to provide a process for the production of polyurethane foam compositions having the aforesaid resistance to smoldering and flaming combustion.

These and other objects of this invention will be made fully apparent from the following general description and the detailed description in the preferred embodiments.

The aforesaid objects of this invention are realized by incorporating urea or melamine or a mixture of urea and melamine (hereinafter, at times, "the smoldering retardant additive") into cured polyurethane foam materials in select amounts. In a particularly preferred embodiment the smolder retardant additive is admixed with shredded or ground polyurethane foam, and the admixture adhesively bonded into dimensionally stable molded configurations. The polyurethane foam obtained is resistant to smoldering and flaming combustion when used alone in foam products or in foam/fabric assemblies. Additionally, the physical characteristics such as density, strength, and resiliency can be controlled, permitting use of the foam materials in a variey of applications including seat cushions; padding used in furniture; mattresses and bedding construction; interiors of automobiles, truck, and buses; marine and aircraft seating and interior assemblies; and cushioning or packaging material designed to provide comfort or support either to people or to other materials of construction. Further, cured polyurethane foam is available as scrap material from other operations utilizing polyurethane foam and, thus, is a relatively inexpensive raw material. Heretofore, however, because of appearance and physical characteristics, bonded or rebonded polyurethane foam was used primarily in the form of underlayment for carpet and rugs where the appearance of the foam was not critical. According to the present invention, however, polyurethane foams can be provided which are resistant to flaming and smoldering combustion, and have the essential physical characteristics which permit use of the foams in applications where conventional rebonded materials have not been capable of use, and can be used in applications which heretofore required virgin polyurethane foam.

The polyurethane foam suitable for use according to the present invention are foams derived from hydroxyl terminated polyester or polyether polyols reacted with organic diisocyanates in the presence of suitable catalysts, surfactants, and blowing agents. Most any polyurethane foam which can be shredded into discrete particles or chips can be adhesively bonded in the presence of urea and/or melamine. Additionally, although the urea and melamine provide resistance to flaming combustion as well as to smoldering combustion, it has been found that flame retardant agents, in addition to the urea and melamine, can be incorporated into the foam during the initial manufacture of the foam or during the bonding process. In this manner rebonded polyurethane foam products can be made that have even greater resistance to flaming combustion. However, the presence of these conventional flame retardant agents did not show any significant improvement in the product's resistance to smoldering combustion.

Flame retarding agents that can be used in addition to the urea and melamine are those known in the art for polyurethane foams and include organic and inorganic compounds that contain varying percentages of chlorine and/or bromine, phosphorous, combinations of halogen and phosphorous, and substances such as antimony oxide, hydrated alumina, and compounds containing boron. These materals can be used in the solid or liquid form. If used as solids, they can be admixed with the foam chips or shredded foam along with the urea and/or melamine. If used as liquids, they can be incorporated along with the binding adhesive or can be sprayed onto the chipped or shredded polyurethane foam prior to the addition of the adhesive.

Examples 1-4 will establish the effectiveness of urea and melamine in providing smoldering and flame-resistant rebonded polyurethane foam. Example 1 demonstrates the improvement in accordance with this invention utilizing urea. Example 2 demonstrates the improvement in accordance with this invention utilizing melamine. Examples 3 and 4 demonstrate the lack of smoldering and flame-retardant characteristics in rebonded polyurethane foams in the absence of urea and/or melamine.

EXAMPLE 1

Flexible polyether polyurethane foam made by the one-shot process to produce conventional cushioning material was shredded on commercially available grinding equipment to yield foam chips having particle sizes typically in the range of one-fourth to one-half inch in diameter. The foam did not contain flame-retarding agents. The foam chips were tumbled in a container equipped with rotating mixing paddles and while tumbling, to each 100 parts by weight of the foam chips, 56 parts by weight of fine particle sized urea is added. The urea was passed carefully through a screening device in order to achieve good distribution as it entered the mixer and contacted the foam chips as they tumbled inside. Tumbling was continued until a good mix was obtained. Examination of the mixture at this stage revealed significant penetration of the urea into the cellular structure of the foam. Some of the urea could also be seen at the surface of the foam chips. While still tumbling, 44 parts by weight of liquid polyurethane binder was added in a uniform manner into the mixture of chips and urea, and the final blend was further tumbled until all liquid binder was well distributed and fully absorbed by the foam. The polyurethane binder utilized is the reaction product of a polyether polyol having a molecular weight in the range of about 3,000 to 6,500 with toluene diisocyanate in the presence of a catalyst, i.e., stannous octoate, a surfactant component, i.e., organosilicone compounds, a tertiary amine catalyst, i.e., N-ethyl morpholine, and sufficient cellosolve acetate solvent to provide a sprayable mixture. The blended material was then placed into a mold and compressed so as to obtain a density of 3.3 pounds per cubic foot. The blend was exposed to live steam for five minutes at low-pressure (maximum 10 psig) in order to bond and cure the blend to the specific density after which the compressed pad of rebonded polyurethane foam was dried in a hot air oven. The rebonded polyurethane foam pad had good strength and resiliency, and the particles of urea were tightly bound within the foam matrix structure. The pad was flexed in a compression apparatus for 100,000 cycles, and it was determined that the pad retained its weight and structural integrity after the flexing. The pad was tested for resistance to ignition from a lighted cigarette in accordance with UFAC procedures described in the UFAC bulletin "Polyurethane Foam Test Method." The cover fabric used was standard Class II fabric as described by UFAC bulletin "Fabric Classification Test Method." The rebonded polyurethane foam prepared according to this example successfully met all of the conditions of the test. There was no ignition of the assembly and the vertical char produced was three-quarters of an inch and less.

In addition to having good resistance to smoldering and flammability combustion, the foam pad was tested for load-bearing characteristics in accordance with ASTM test method D-1564. The pad gave a 25 percent ILD of 35 pounds, and a 65 percent ILD of 125 pounds. The ratio of the load at 65 percent divided by the load at 25 percent, recognized in the furniture, mattress, and automotive seating industry as a support factor which is desired to be at least 2.0 and preferably greater than 2.0; is calculated to be 3.57 which is a significant improvement and establishes the marketability of the rebonded product in such application. The pad was tested and found to meet the flammability of the Federal Aviation Administration Regulation No. 25.853 which applies to the compartment interiors of aircraft. The requirement under paragraph (b) of this federal standard is that the part used, for example seat cushions, when tested as prescribed; not have an average burn length exceeding eight inches, or an average flame time after removal of the flame source not to exceed 15 seconds, or have drippings from the test specimen continue to flame for more than an average of five seconds after falling. The pad prepared by this Example 1 under this test gave an average burn length of two to three inches, an average flame time of zero to three seconds, and an average flaming dripping time of zero to two seconds.

EXAMPLE 2

Example 1 was repeated in all respects except that melamine replaced the urea in the following proportion of components. To 100 parts by weight of the foam chips that were used in Example 1 was added about 67 parts by weight of melamine. The weight of liquid polyurethane binder used was 44 parts. The pad that was made had a density of 3.60 pounds per cubic foot, a 25 percent ILD of 33, a 65 percent ILD of 120, giving a support factor of 3.64. The results of the UFAC cigarette ignition test demonstrated that no ignition of the filling/fabric assembly occurred, and the vertical char produced was one and one-fourth inches and less. This pad met the requirements of FAA Regulation No. 25.853 demonstrating an average burn length of three to four inches, an average flame time of zero to seven seconds, and an average flaming dripping time of zero to three seconds.

EXAMPLE 3

Example 1 was repeated in all respects except that in this instance no urea or melamine was added to the foam chips or particles. The blended material prepared as described in Example 1 was placed into a mold and compressed so as to obtain a density of approximately 2.5 pounds per cubic foot. After being exposed to live steam and dried, as described in Example 1, the rebonded polyurethane foam was found to have excellent resiliency and strength well suited for use as a seating material.

For comparison purposes another pad designated as pad Example 3a was cut from a block of regularly produced (not rebonded) conventional flexible polyether polyurethane foam, which like the pad of this Example 3 did not contain any flame-retarding agent. Both pads, Example 3 and Example 3a, were then tested for resistance to ignition from a lighted cigarette by the procedure described in the UFAC bulletin noted in Example 1. The cover fabric which was over the pads was a standard Class II fabric as defined in the UFAC bulletin described in Example 1. Both pads Example 3 and Example 3a failed the test criteria due to ignition of the filling/padding materials and extensive propagation of smoldering combustion.

EXAMPLE 4

To further demonstrate the effectiveness of the addition of urea or melamine as an additive to the foam composition, for purposes of comparison, to 100 parts by weight of the foam chips that were used in Example 1 there were added 36 parts hydrated alumina, 25 parts ammonium polyphosphate, 24 parts decabromodiphenyl oxide, and 22 parts tris(chloropropyl)phosphate. The weight of liquid polyurethane binder used in bonding the foam particles was 51 parts per 100 parts of the foam chips. The pad formed in accordance with the process of Example 1 had a density of 3.35 pounds per cubic foot, a 25 percent ILD of 30 pounds, a 65 percent ILD of 105 pounds, giving a support factor of 3.5. The pad as thus produced was found to meet the flammability requirements of Federal Motor Vehicle Safety Standard No. 302 wherein one-half inch specimens were unable to maintain a burning rate and extinguished themselves within a short time after ignition. However, the pad of this example failed the test criteria of the UFAC cigarette resistance test with Class II fabric due to ignition of the filling/padding material as well as extensive propagation of smoldering combustion.

In addition to providing polyurethane foams which are excellently suitable for use as cushioning materials, either alone or in combination with fabric materials, it has been found that the rebonded polyurethane foam containing the urea and/or melamine as described hereinbefore can be used in the form of a barrier layer which is wrapped around or covers in part a seat or cushion made from conventional polyurethane foam. This particular assembly or structure not only preserves the support and comfort of the primary polyurethane foam cushion, but the barrier layer provides the resistance to smoldering combustion that cannot be obtained with conventional cushioning in contact with Class II fabrics. By way of explanation, it is to be understood that the barrier layer, as above described, lies positioned between the upholstery fabric and the foam cushion material. The ability to use the rebonded foam of this invention as a barrier layer makes it possible for a wide variety (from soft to extra-firm, for example, or from lower to higher density) polyurethane foams to have application as seating or cushioning in combination with a broad selection of Class II materials. Where economics plays a sufficient role, this ability will permit savings in the cost of the seating which might otherwise require special materials, formulations, or post-treatment to ensure compliance with safety standards. Example 5, hereinafter following, establishes how rebonded polyurethane foam can be made into a barrier material that can be interposed in the form of a sheet or liner between conventional, non-flame retardant foam cushioning and Class II fabrics to shield the assembly from cigarette ignition.

EXAMPLE 5

To 100 parts by weight of the foam chips that were described in Example 1 was added 64 parts by weight of urea and about 55 parts by weight of liquid polyurethane binder also as described in Example 1. The blended material was placed in a mold and compressed so as to obtain a density of approximately 4.0 pounds per cubic foot. The blend was then steam-cured and dried as described in Example 1. The rebonded polyurethane barrier material obtained after the steam-curing and drying had excellent strength and resiliency, and the particles of urea were tightly bound within the foam matrix structure. A sheet of this material approximately $\frac{3}{8}$ of an inch in thickness was tested in accordance with the UFAC bulletin "Barrier Test Method." The foam obtained corresponded in properties to Product Code 2715 as given in the UFAC bulletin. Results of the lighted cigarette test showed no ignition of the assembly, and the vertical char was limited to about $\frac{3}{8}$ of an inch or less.

An additional feature in accordance with the present invention is that it is possible to capitalize on the availability of scrap polyether and polyester urethane foams to meet a characteristic heretofore unavailable with polyurethane foams; that is, it is possible to bond or rebond foams having the desirable characteristics of both polyester foams and polyether foams. For example, it is possible to utilize foam chips of less resilient polyester polyurethane foams in combination with foam chips of the normally more resilient polyether urethane foams. It is also possible to achieve even more specific properties in the rebonded product by blending together, in suitable and different proportions, foam chips of both polyester and polyether urethane foams which, in addition to having the combined features of polyester and polyether foams, have substantial resistance to smoldering combustion as well as flaming combustion. This type of foam is illustrated in the following example.

EXAMPLE 6

The foam chips of this example were produced by shredding polyester polyurethane foam to yield chips whose dimensions were typically one-fourth inch to three-fourths inch in length and/or width, and in the range of 0.030 inches to 0.250 inches in thickness. The thickness dimensions given arise from the fact that the polyester foam stock was in the form of thin sheets of material that had been peeled on commercial cutting equipment from cylindrical blocks of foam material. Polyether foam chips having the dimensions as described in Example 1 were admixed with the polyester chips at the ratio of approximately 50:50. To 100 parts by weight of the mixture of polyester and polyether foam were added 55 parts by weight of urea and 37 parts by weight of liquid polyurethane binder. The materials were processed as described in Example 1. The blended material was placed in a mold and compressed so as to obtain a density of approximately 3.5 pounds per cubic foot. The blend was then steam-cured and dried as in Example 1. The rebonded polyurethane foam pad had the desirable characteristics of a polyester foam pad and, also, the desirable characteristics of a polyether foam pad. The foam pad satisfied all of the criteria of the UFAC cigarette ignition test as described in Example 1, and further satisfied the requirements of the FAA Regulation No. 25.853.

In the aforesaid examples and in accordance with the present invention, the smoldering retardant additive can be present at from about 40 to 100 parts per 100 parts of polyurethane foam chips. Preferably the smoldering retardant additive will be present at from about 50 to 75 parts per 100 parts of polyurethane foam chips. It has been observed that not all Class II fabrics are affected equally when used in combination with polyurethane foam and exposed to smoldering combustion. Therefore, it may be necessary to use more or less smoldering retardant additive for a particular application.

Further, although both urea and melamine provide resistance to smoldering and flaming combustion, at times, depending upon the end application of the foam, one material can be preferred over another. For example, melamine is not water soluble. Accordingly, if the end product is a product which is to be subjected to water washing, melamine is the preferred smolder retardant additive. For certain other applications, urea would be a logical choice.

The liquid polyurethane binder as employed herein and as stated in the examples which can be any of the known urethane formulations that can be cured to provide a flexible cellular material is present in an amount sufficient to provide good bonding, and normally will be used in an amount of 30 to 60 parts per 100 parts of foam chips. The binder can be prepared from the required components and used immediately, or it can be stored in closed containers for later use. It is normally required that the binder be thinned with a suitable solvent, such as cellosolve acetate, so that it can be sprayed with equipment that employs either the airless or air-type principle.

While the examples as set forth hereinbefore illustrate the use of live steam at low pressure to expand and cure the binder in combination with the compressed foam chips, other methods can also be utilized. One such method comprises adding water to the foam chips and mixing thoroughly prior to the addition of the liquid polyurethane binder. Thereafter, after all of the various components required for the composition have been added and the pad compressed to the desired density, warm air is then passed through the pad to expand, cure, and dry the rebonded polyurethane material.

As previously stated, the present invention permits the use of virtually any cured polyurethane foam in the preparation of the improved polyurethane foams having resistance to both smoldering and flaming combustion. These foams, as known to one skilled in the art, can be based on polyester or polyether polyols reacted with the various polyisocyanates such as toluene diisocyanate. As previously mentioned, the present invention is imminently suitable for use with scrap polyurethane foam materials such as scrap material obtained in other polyurethane foam operations, including the fabrication of thin sheets of polyurethane foam derived from peeling round blocks of polyurethane foam. Further, although the examples, as set forth hereinabove, are primarily concerned with rebonded, cured polyurethane foam which is the highly preferred embodiment, it is possible to impregnate cured virgin polyurethane foam with urea and/or melamine as, for example, by forming a solution of urea in water and applying it uniformly to blocks or pads of polyurethane foam; or forming a solvent solution or dispersion of melamine and applying the solvent solution or dispersion to blocks or pads of polyurethane foam. Provided that the urea and/or melamine is uniformly impregnated in the amounts stated hereinbefore, the smoldering combustion characteristics of the foam will be greatly enhanced.

The effect of the urea and/or melamine on the cured polyurethane foam is particularly surprising in that conventional flame retardants such as the halides, phosphorous compounds, and the boron-containing materials commonly used for this purpose with other materials such as cotton have little or no effect on the smoldering characteristics of polyurethane foam.

While the cured polyurethane foam of this invention is well suited for use in cushioning for seating and mattresses, it has other uses in various resilient products where such applications require more smolder-resistant and flame-resistant foam materials. These applications include textiles such as wearing apparel and blankets; thermal and acoustical insulation for home, industry, and transportation; packaging for military and industrial hardware; as well as carpet underlayment; air filters; athletic equipment, toys and novelties—as examples only.

Various modifications to the invention as above described will be apparent to those skilled in the art.

It is claimed:

1. A flexible, cured polyurethane foam article which comprises chips or particles of a polyurethane foam which is the reaction product of a polyether or polyester polyol and a polyisocyanate bonded together with a polyurethane foam binder, said polyurethane foam binder being the product formed in a one-step reaction product of a polyether or polyester polyol and a polyisocyanate, said cured and bonded polyurethane foam article having substantially uniformly incorporated therein a member of the group consisting of urea, melamine, and mixtures thereof in an amount ranging from about 40 to 100 parts per 100 parts of polyurethane foam, said amount being sufficient to provide resistance of the foam to smoldering combustion.

2. The flexible, cured polyurethane foam article of claim 1 wherein said urea or melamine is present in an amount of from about 50 to 75 parts per 100 parts of said polyurethane foam.

3. A flexible, cured polyurethane foam pad, said polyurethane foam being the reaction product of a polyether or polyester polyol and a polyisocyanate, said pad comprising chips or particles of said polyurethane foam bonded with a polyurethane foam binder and having substantially uniformly incorporated therein a member of the group consisting of urea, melamine, and mixtures thereof in an amount of from about 40 to 100 parts per 100 parts of foam chips or particles, said amount being sufficient to provide resistance of said polyurethane foam to smoldering combustion.

4. The polyurethane foam of claim 3 wherein said polyurethane foam binder is present in an amount of from about 30 to 60 parts per 100 parts of chips or particles.

5. The polyurethane foam of claim 3 wherein said urea or melamine is present in an amount of from about 50 to 75 parts per 100 parts of chips or particles.

6. The method of making a flexible polyurethane foam pad having resistance to smoldering combustion comprising (1) providing chips or particles of a polyurethane foam which is the reaction product of a polyether or polyester polyol and a polyisocyanate; (2) mixing said polyurethane foam chips or particles with a member of the group consisting of urea, melamine, and mixtures thereof to provide a substantially uniform mix, said urea and melamine being incorporated into said foam chips; (3) adding a liquid polyurethane binder in an amount sufficient to bond said chips and urea and melamine together; (4) compressing said mixture to provide a selected density; and (5) curing said polyurethane binder to provide a structurally unitary pad.

7. The method of claim 6 wherein said curing is accomplished by applying low pressure steam to said compressed pad and thereafter drying.

8. The process of claim 6 wherein said curing is performed by adding water to the mixture of foam chips or particles and urea or melamine, and thereafter passing warm air over said compressed pad.

9. As an article of manufacture a cushioning material comprising a rebonded polyurethane foam as defined in claim 3.

10. As an article of manufacture a cushioning material comprising a resilient and flexible padding, a fabric layer, and positioned between said padding and fabric layer a barrier layer comprising a flexible, cured polyurethane foam pad as defined in claim 3.

11. The article of manufacture of claim 10 wherein the resilient and flexible padding is a polyurethane foam padding.

12. The method of claim 6 wherein said polyurethane binder is used in an amount of from about 30 to 60 parts per 100 parts of chips or particles.

13. The method of claim 6 wherein said urea or melamine is present in an amount of from about 50 to 75 parts per 100 parts of chips or particles.

* * * * *